United States Patent [19]

Edwards et al.

[11] Patent Number: 5,636,818
[45] Date of Patent: Jun. 10, 1997

[54] SHOPPING CART DISPLAY SUPPORT BRACKET

[76] Inventors: Alfred L. Edwards, P.O. Box 279, Hermitage, Tenn. 37076; William P. Nash, 87 Willow Ave., Cookeville, Tenn. 38511

[21] Appl. No.: 519,539

[22] Filed: Aug. 25, 1995

[51] Int. Cl.6 ............................................. A47B 96/06
[52] U.S. Cl. .................. 248/214; 40/308; 248/447.2; 248/301
[58] Field of Search ........................ 248/214, 229.15, 248/229.25, 215, 301, 211, 447.2, 455, 456; 40/308

[56] References Cited

U.S. PATENT DOCUMENTS

| | | | |
|---|---|---|---|
| D. 287,370 | 12/1986 | Stoll et al. | D18/7 |
| D. 328,607 | 8/1992 | Brennan | D18/7 |
| D. 351,403 | 10/1994 | Hood et al. | D18/7 |
| D. 351,404 | 10/1994 | Hood et al. | D18/7 |
| D. 351,405 | 10/1994 | Hood et al. | D18/7 |
| D. 351,406 | 10/1994 | Hood et al. | D18/7 |
| D. 351,407 | 10/1994 | Ewert | D18/7 |
| D. 351,408 | 10/1994 | Hood et al. | D18/7 |
| D. 351,409 | 10/1994 | Hood | D18/7 |
| 1,919,767 | 7/1933 | Bohlman | 248/316.1 |
| 2,679,372 | 5/1954 | May | 248/447.2 |
| 2,888,761 | 6/1959 | Miller | 40/308 |
| 3,202,389 | 8/1965 | Zoffer | 248/455 X |
| 3,426,990 | 2/1969 | Pady | 248/447.2 X |
| 3,881,267 | 5/1975 | Hicks | 40/308 |
| 4,044,980 | 8/1977 | Cummins | 248/456 |
| 4,156,318 | 5/1979 | Economy | 40/308 |
| 4,443,961 | 4/1984 | Gilroy | 40/308 |
| 4,685,701 | 8/1987 | Amundson et al. | 248/441.1 |
| 4,773,660 | 9/1988 | Trubiano | 248/214 |
| 4,901,969 | 2/1990 | Yaeger | 248/447.2 X |
| 5,086,960 | 2/1992 | Schwietzer | 248/456 |
| 5,263,578 | 11/1993 | Narvey | 211/10 |
| 5,280,932 | 1/1994 | Folsom | 280/33.992 |

Primary Examiner—Leslie A. Braun
Assistant Examiner—Kimberly T. Wood
Attorney, Agent, or Firm—Wascher & Thomas, PLLC; Rick R. Wascher; Laura K. Thomas

[57] ABSTRACT

A bracket assembly for mounting and supporting objects on shopping carts, comprising a mounting member and a U-shaped clamp configured to receive the handle of a shopping cart and capable of adjustable attachment to the mounting member. The mounting member has spaced apart ends extending from a central portion having spaced apart bores. The U-shaped clamp has outturned ends with slots positioned to align with the bores of the central portion of the mounting member for adjustable attachment thereto. The bracket assembly may include a support member configured to operably engage an inner surface of the mounting member and attached to the mounting member at the central portion and one of the spaced apart ends of the mounting member.

18 Claims, 7 Drawing Sheets

SHOPPING CART DISPLAY SUPPORT BRACKET

BACKGROUND OF THE INVENTION

1. Field of the Invention

The present invention relates generally to brackets for mounting and supporting objects, but more particularly to such brackets capable of adjustment for mounting and supporting objects, including advertising displays, calculators and the like, on shopping carts of various configurations.

2. Description of the Related Art

The art to which the invention relates includes devices or apparatuses for mounting and supporting objects, such as calculators, advertising displays or the like, on shopping carts.

Wheeled shopping carts are commonly used in self-serve shopping environments such as grocery stores, discount stores, drugs stores and warehouse-type stores to provide a means for shoppers to conveniently transport items to be purchased about the store and, subsequently, to their parked vehicles after the purchase has been completed. After purchased items have been loaded into the shoppers' vehicles, shopping carts are typically parked in racks or corrals located in the parking lot, where they are exposed to the elements until they are collected by store personnel. Shopping carts are typically capable of nesting so that they may be moved en masse and stored in a smaller area when not in use.

Many merchants have found it desirable to provide, as an added convenience to the shopper, helpful items or useful information mounted directly on the shopping cart for ready use by the shopper. In addition, shopping carts provide an ideal location for merchants to advertise various products and services. Accordingly, many shopping carts are now equipped with calculators, store directories, advertising display devices, or a combination thereof.

U.S. Pat. No. 5,280,932 granted to Folsom, incorporated by reference as if fully set forth herein, is directed to a shopping cart advertising display device. The Folsom apparatus includes a waterproof advertising holder and a calculator assembly attached to the front wall of the upper rear receptacle of a shopping cart by rivets or like means. The Folsom apparatus further comprises a transparent cover plate positioned over advertising copy and attached to a display plate with a keyed quick release fasterner and forward release hinge. A calculator with a protective bumper is attached to the upper fight of the cover plate.

U.S. Pat. No. 5,263,578 granted to Narvey, incorporated by reference as if fully set forth herein, is directed to a coupon holder container. The Narvey apparatus includes forward and rear container cavities having a spring clip for securement to a handle portion of a shopping cart. The forward container cavity includes a forward wall mounting, a plurality of U-shaped supports for receiving a pencil or, alternatively, a support plate having a support flange projecting forwardly of and below the forward container for supporting a calculator.

The list that follows is directed to patents for calculators mounted on shopping carts. Characteristic of all of these design patents is that the actual housing of the calculator directly engages the handle of a shopping cart and thus serves as part of the means for clamping the device to the handle.

| U.S. Pat. No. | Inventor |
| --- | --- |
| D351,409 | Hood |
| D351,408 | Hood et al. |
| D351,407 | Ewert |
| D351,406 | Hood et al. |
| D351,405 | Hood et al. |
| D351,404 | Hood et al. |
| D351,403 | Hood et al. |
| D328,607 | Brennan |
| D287,370 | Stoll et al. |

Until now, it is believed that a bracket useful for mounting and supporting objects, such as calculators, advertising display devices and the like, on shopping carts and capable of adjustment for accommodating various shopping cart configurations, has not been invented.

SUMMARY OF THE INVENTION

The present invention is directed to a device for mounting and supporting objects on shopping carts. The inventive device includes a bracket assembly that adjustably attaches to a handle and a pivot bar of a rear nesting gate of a shopping cart. The bracket assembly includes a mounting member and a U-shaped clamp configured to receive the handle of a shopping cart and capable of adjustable attachment to the mounting member. The bracket assembly may include a support member rigidly attached to the mounting member to provide further structural stability. The bracket assembly is preferably constructed of stainless steel, but may be constructed of any rigid, non-breakable material suitable for resisting the effects of exposure to the outdoor elements (e.g., high strength plastics, etc).

The mounting member has spaced apart ends extending from a central portion. One end extends upwardly from the central portion, forming an acute angle therewith, and has at least one bore extending therethrough for attachment of objects to an outer surface. Another end extends from the central portion into a hook-shaped configuration to receive a pivot bar of a rear gate of a shopping cart, and has two axially aligned bores extending therethrough. The central portion has spaced apart bores extending therethrough intermediate the spaced apart ends.

The U-shaped clamp is configured to receive a handle of a shopping cart and includes outturned ends having slots extending therethrough for adjustable attachment to the outer surface of the mounting member at the central portion.

The support member includes spaced apart ends extending angularly from a central portion. The support member is configured to cooperatively engage the mounting member such that the ends of the support member communicate with the inner surface of the mounting member at the upwardly extending portion and the central portion of the mounting member. The ends of the support member are provided with bores extending therethrough for rigid attachment to the mounting member.

A spacer may be provided to be received within the hook-shaped end of the mounting member to protect shoppers or children riding in the shopping cart from any sharp edges.

The embodiments of the present invention may, therefore, be summarized in a variety of ways, one of which is the following: a bracket assembly for mounting objects on a shopping cart having a handle and a rear gate having a pivot bar, the bracket assembly comprising a mounting member having spaced apart ends extending angularly from a central portion; and a clamp configured to receive the handle of the shopping cart and adjustably attached to the mounting member. The bracket assembly further comprises at least one fastener for attaching the components.

One of the spaced apart ends of the mounting member extends upwardly from the central portion of the mounting member to form an angle therewith, and the other end extends from the mounting member to form a hook capable of receiving the pivot bar of the gate of the shopping cart. The central portion of the mounting member further includes spaced apart bores extending transversely therethrough, and the clamp has outturned ends having transverse slots positioned to align with the spaced apart bores of the central portion of the mounting member.

The bracket assembly may further include a support member having spaced apart ends extending angularly outward from a central portion, wherein the spaced apart ends of the support member are configured to operably engage an inner surface of the mounting member and wherein the support member is attached to the mounting member at the central portion and one of the spaced apart ends of the mounting member. Each of the spaced apart ends of the support member extend outwardly from the central portion of the support member to form an angle therewith.

The bracket assembly may also include a spacer having a body configured to cooperatively engage the hook-shaped end of the mounting member. The hook-shaped end of the mounting member includes a pair of axially aligned bores extending therethrough, and the body of the spacer further comprises a longitudinal bore positioned to align with the axially aligned bores of the hook-shaped end of the mounting member when the spacer is operably positioned at the hook-shaped end of the mounting member.

Yet another way of summarizing the invention is: a bracket assembly for mounting objects on a shopping cart, comprising a mounting member having an upwardly extending end, a hook-shaped end, and a central portion therebetween; and a clamp adjustably attached to the mounting member and configured to receive a handle of the shopping cart.

A third way of summarizing the invention is as follows: a bracket assembly for mounting objects on a shopping cart having a handle and a rear gate having a pivot bar, the bracket assembly comprising a mounting member having an upwardly extending end, a hook-shaped end for receiving the pivot bar of the rear gate of the shopping cart, and a central portion therebetween having spaced apart bores extending therethrough; a clamp having outturned ends having slots, wherein the clamp is configured to receive the handle of the shopping cart and the slots align with the spaced apart bores of the central portion of the mounting member for adjustable attachment thereto; a support member having spaced apart ends extending angularly outward from a central portion, wherein the spaced apart ends of the support member are configured to operably engage an inner surface of the mounting member and wherein the support member is attached to the mounting member at the central portion and one of the spaced apart ends of the mounting member; a spacer having a body configured to cooperatively engage the hook-shaped end of the mounting member; and at least one fastener for attaching the bracket assembly.

It is an object of the present invention to provide a bracket assembly capable of adjustable attachment to a shopping cart.

It is an object of the present invention to provide a universal bracket assembly capable of adjustable attachment to a variety of differently configured shopping carts.

It is an object of the present invention to provide a bracket assembly for mounting and supporting objects on a shopping cart without interfering with the nesting capability of the cart.

It is an object of the present invention to provide a bracket assembly for mounting and supporting objects on a shopping cart that is capable of withstanding exposure to the outdoor elements.

It is an object of the present invention to provide a bracket assembly that can be rigidly secured to the handle of a shopping cart and that prevents the rotation of a mounted object about the handle of the shopping cart.

These and other objects, features and advantages shall become apparent after consideration of the description and drawings set forth herein. All such objects, features and advantages are contemplated to be within the scope of the present invention even though not specifically set forth herein.

DETAILED DESCRIPTION OF THE PREFERRED EMBODIMENT

Figure 1:
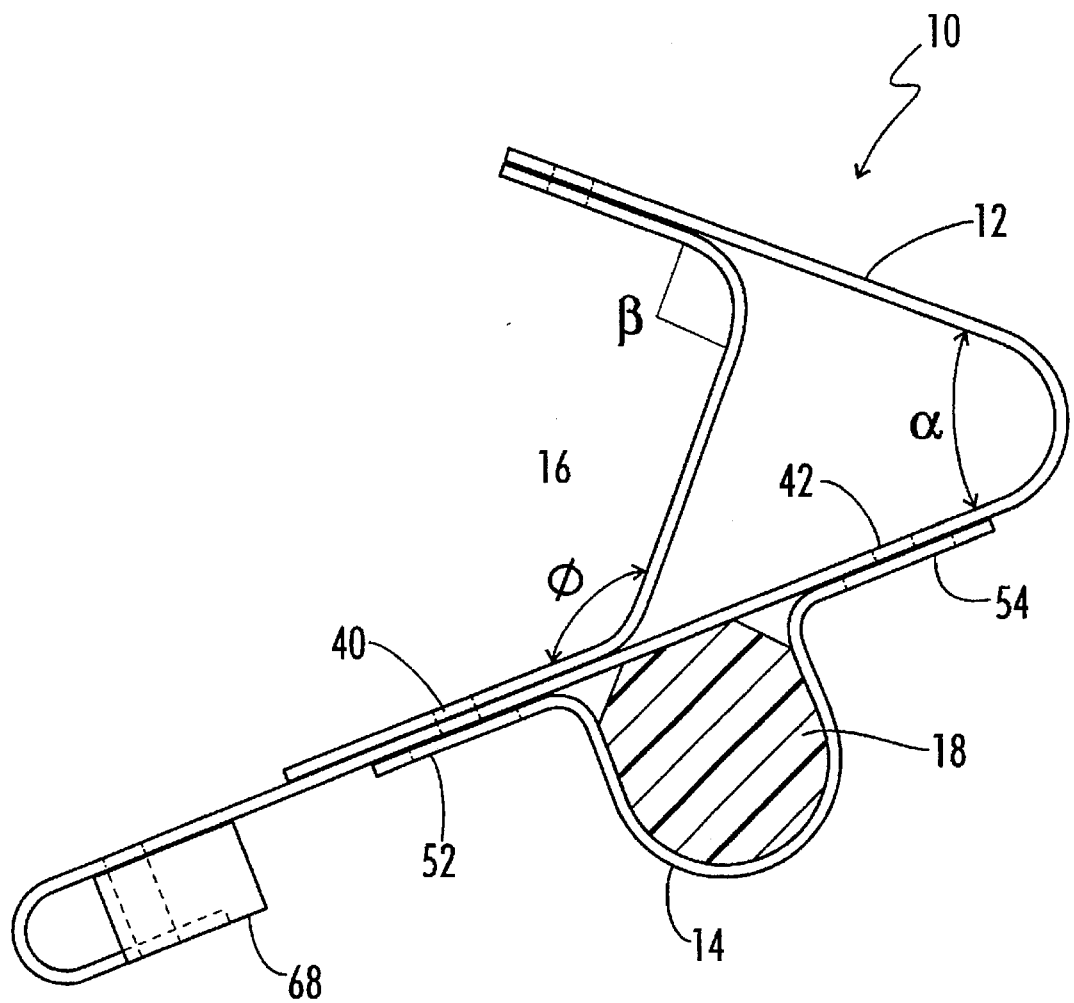
FIG. 1 is a left side view of an embodiment of the present invention attached to a handle of a shopping cart, which is shown in cross-section.
Figure 2A:
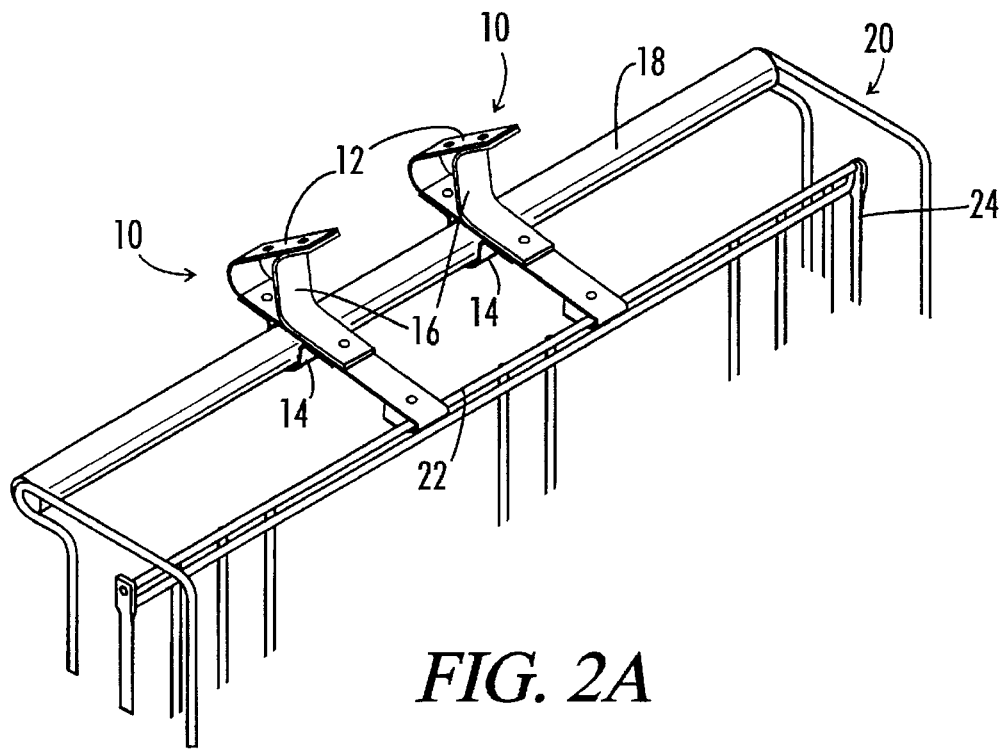
FIG. 2A is an elevated perspective view of the embodiment of the invention shown in FIG. 1.
Figure 2B:
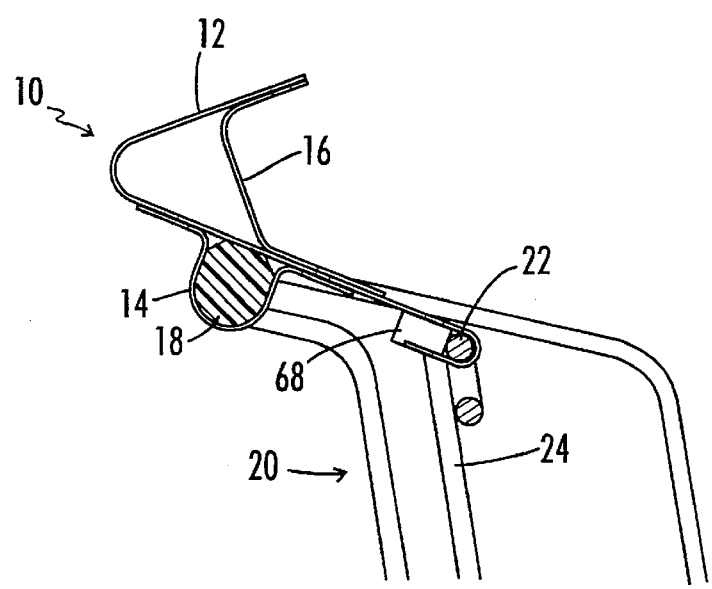
FIG. 2B is a right side view of the embodiment of the invention shown in FIG. 1.

An embodiment of the present invention is designated generally by the reference numeral 10 in FIGS. 1, 2A and 2B. Embodiment 10 includes a mounting member 12, a U-shaped clamp 14, and a support member 16 adjustably attached to a handle 18 and a pivot bar 22 of a shopping cart 20.

Figure 3B:
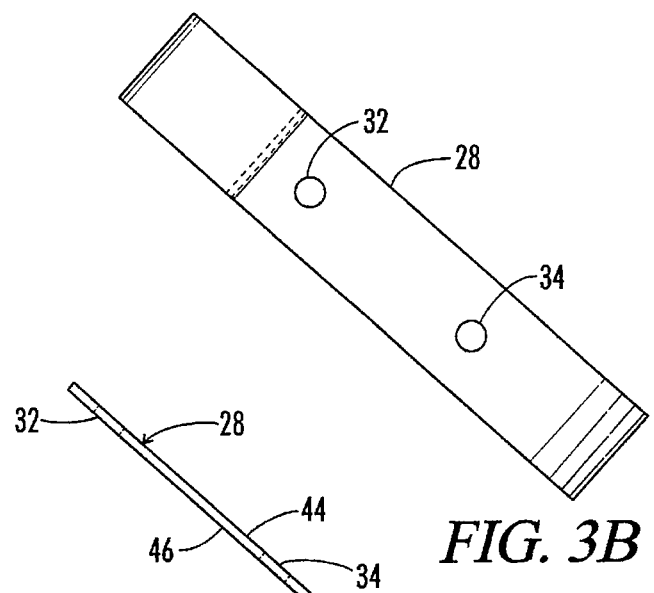
FIG. 3B is an orthographic top view of the mounting member shown in FIG. 3A.
Figure 3A:
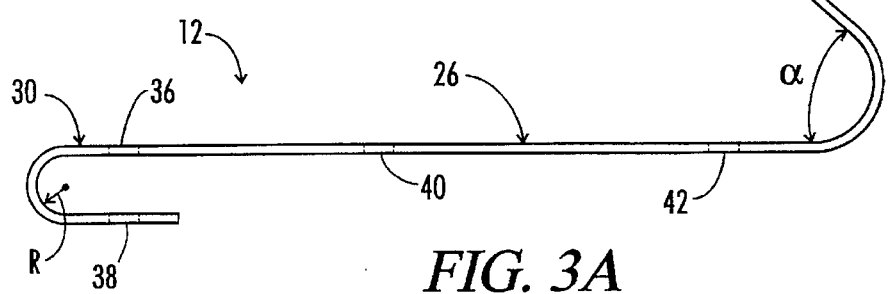
FIG. 3A is a side view of a mounting member of the present invention.
Figure 3C:
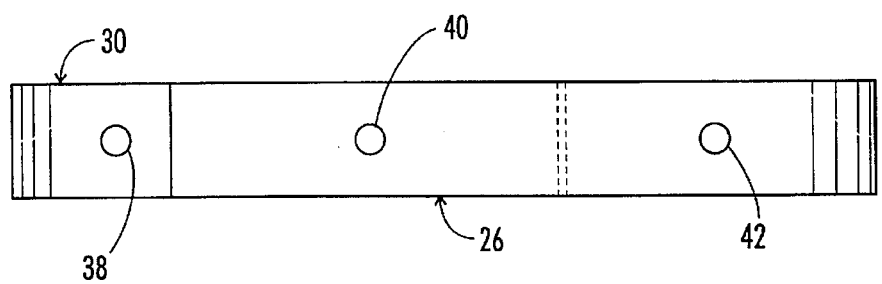
FIG. 3C is a bottom view of the mounting member shown in FIG. 3A.

With reference to FIGS. 3A, 3B and 3C, the mounting member 12 includes an outer surface 44, an inner surface 46, a central portion 26 and spaced apart ends 28 and 30 extending therefrom. End 28 extends upwardly from the central portion 26 to form an acute angle alpha therewith, and preferably includes two bores 32 and 34 for receiving a fastener 78 such as bolts, pins or screws, for mounting an object to the outer surface 44 of the mounting member 12. However, attachment by any other suitable means, such as adhesives or clamps, is contemplated. End 30 extends downwardly from the central portion 26 into a hook-shaped configuration having a radius R, for receiving a pivot bar 22 on a rear gate 24 of a shopping cart 20 (FIGS. 2A and 2B). Hook-shaped end 30 preferably has a pair of axially aligned bores 36 and 38 extending therethrough. Similarly, the central portion 26 preferably has a pair of bores 40 and 42 extending therethrough.

Figure 4A:
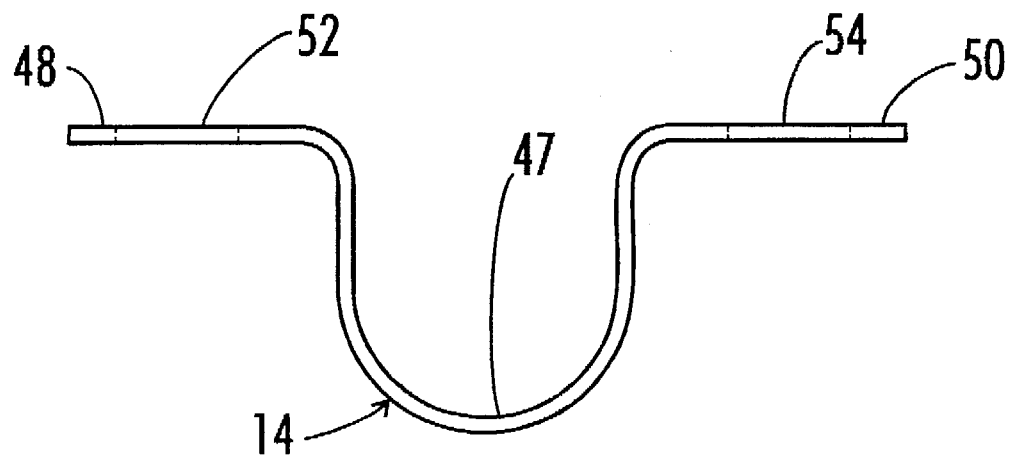
FIG. 4A is a side view of a U-shaped clamp of the present invention.
Figure 4B:
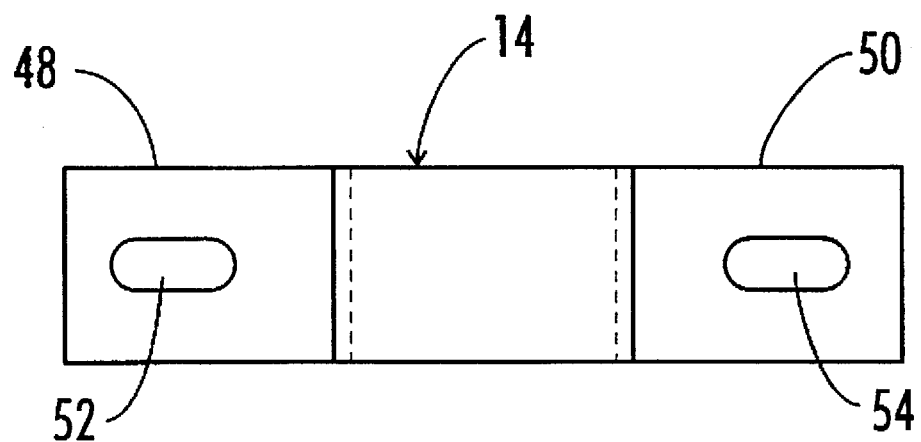
FIG. 4B is a top view of the U-shaped clamp shown in FIG. 4A.

With reference to FIGS. 4A and 4B, a U-shaped clamp, designated generally by the reference numeral 14, has a central depression 47 interpositioned between outturned ends 48 and 50, and is configured to receive a handle 18 of a shopping cart 20. Outturned ends 48 and 50 further include slots 52 and 54, preferably positioned to cooperatively align with bores 40 and 42, respectively, of the mounting member 12 for adjustable attachment thereto with fasteners such as bolts, screws or any other suitable means of attachment, including rivets, pins, etc. (see FIG. 1).

Figure 5B:
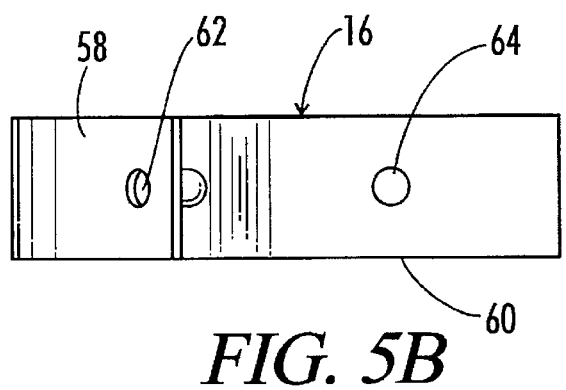
FIG. 5B is a top view of the support member shown in FIG. 5A.
Figure 5A:
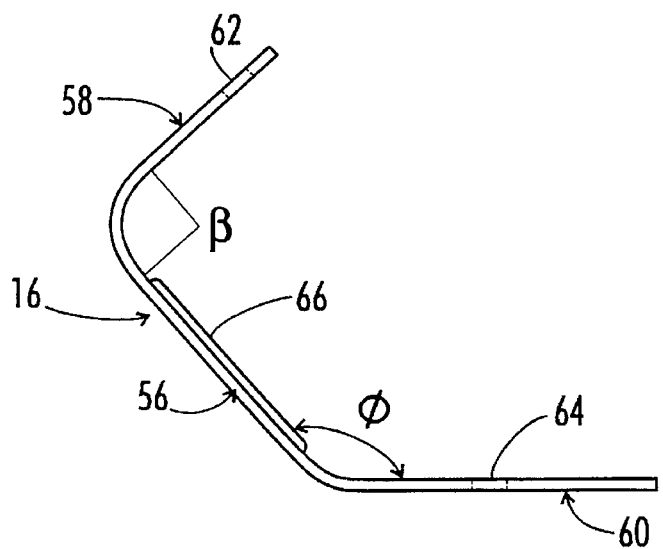
FIG. 5A is a side view of a support member of the present invention.
Figure 5C:
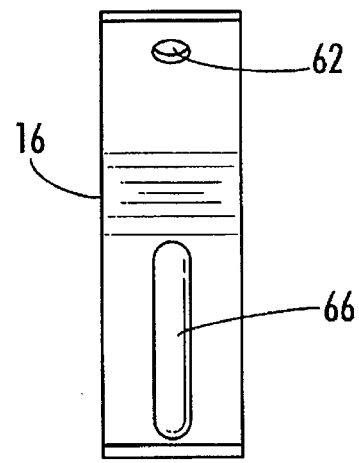
FIG. 5C is a front view of the support member shown in FIG. 5A.

With reference to FIGS. 5A, 5B and 5C, a support member, designated generally by the reference numeral 16, includes a central portion 56 having a gusset 66, interpositioned between spaced apart ends 58 and 60, which extend angularly from the central portion 56. End 58 extends outwardly from the central portion 56, forming angle beta and having a bore 62 extending therethrough. In the preferred embodiment, the angle beta is a right angle Similarly, end 60 extends outwardly from the central portion 56, forming obtuse angle phi and having a bore 64 extending therethrough. Ends 58 and 60 of the support member 16 are configured to communicate with upwardly extending end 28 and central portion 26, respectively, of the mounting member 12 (FIG. 3A) when the support member 16 is positioned adjacent the inner surface 46 of the mounting member 12 (see FIGS. 1, 2A, 2B, 7A and 7B).

In the preferred embodiment, bores 62 and 64 of the support member 16, therefore, align with bores 32 and 34 of the mounting member 12 for attachment thereto. Attachment by any suitable means, including fasteners 78 such as bolts, screws, pins, rivets or welds, is contemplated, or, with respect to an alternate embodiment, the components may be formed integral with one another.

Figure 6A:
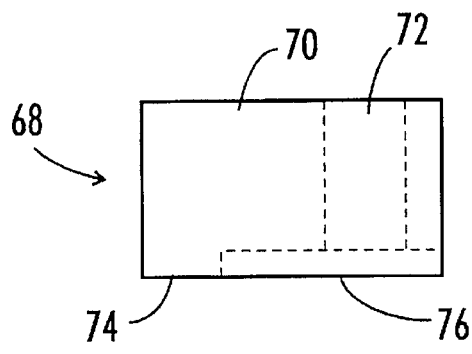
FIG. 6A is a side view of a spacer of the present invention.
Figure 6B:
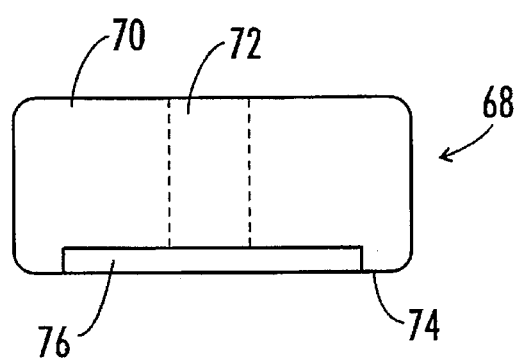
FIG. 6B is a rear view of the spacer shown in FIG. 6A.
Figure 6C:
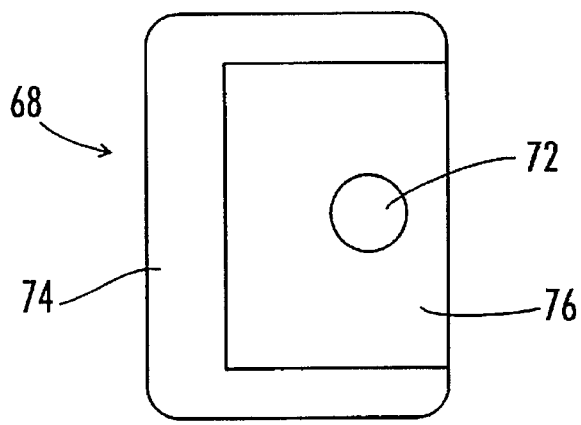
FIG. 6C is a bottom view of the spacer shown in FIG. 6A.

With reference to FIGS. 6A, 6B and 6C, a spacer, designated generally by reference numeral 68, includes a body 70 having a longitudinal bore 72 extending therethrough and opening into a recess 76 at a bottom surface 74. Spacer 68 is configured to cooperatively engage the interior of the hook-shaped end 30 of the mounting member 12, and bore 72 is preferably positioned to align with bores 36 and 38 of the hook-shaped end 30 (see FIGS. 1 and 2B) for attachment thereto by any suitable fastener 78, such as a bolt, screw or pin.

Figure 7A:
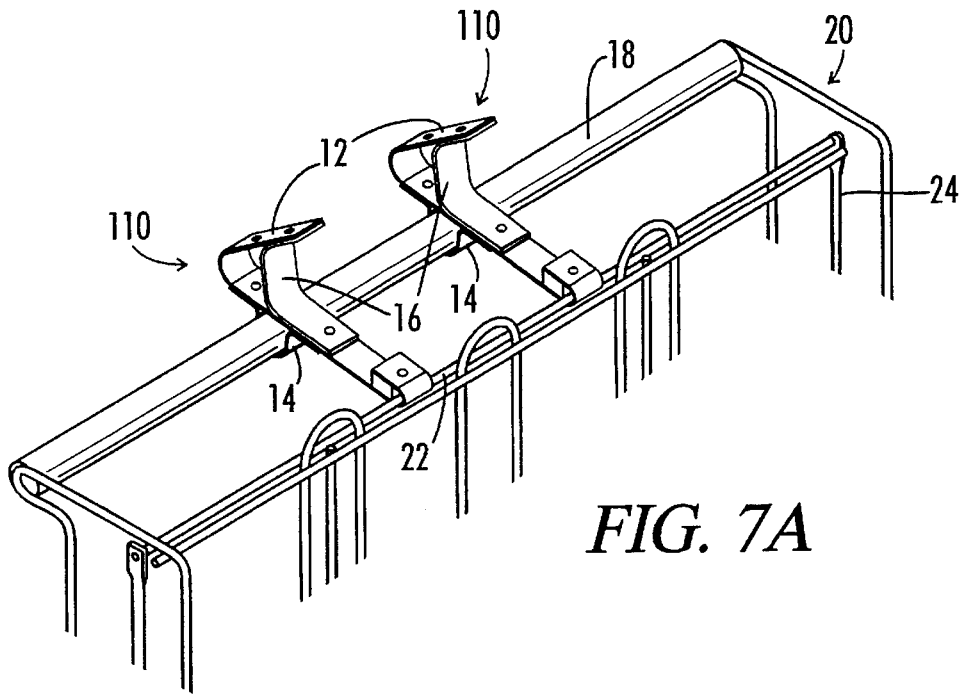
FIG. 7A is an elevated perspective view of an alternate embodiment of the invention shown in FIG. 2A.
Figure 7B:
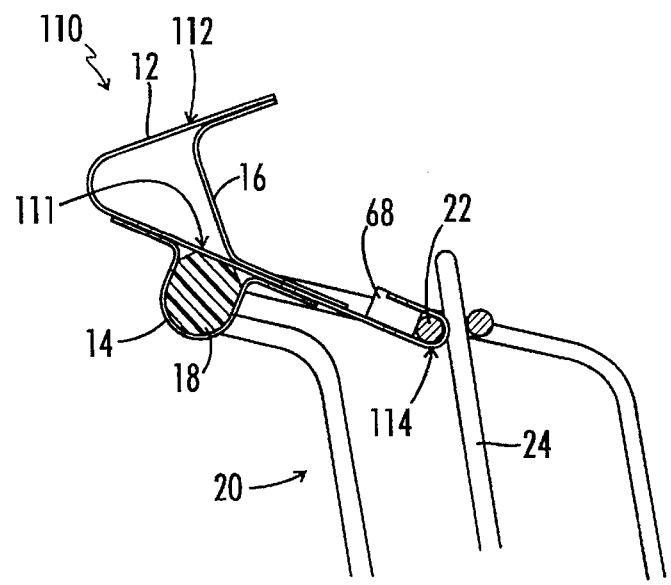
FIG. 7B is a partial side view of an alternate embodiment of the invention shown in FIG. 7A.

An alternate embodiment of the present invention is designated generally by the reference numeral 110 in FIGS. 7A and 7B. Alternate embodiment 110 includes a mounting member 12 having a central portion 111 interpositioned between spaced apart ends 112 and 114, a U-shaped clamp 14, and a support member 16 adjustably attached to a handle 18 and a pivot bar 22 of a shopping cart 20. In the alternative embodiment, one of the spaced apart ends 112 (or 114) of mounting member 12 extends upwardly from the central portion 111 into a hook-shaped configuration having a radius R, for receiving a pivot bar 22 on a rear gate 24 of a shopping cart 20. A spacer 68 is configured to cooperatively engage the interior of the hook-shaped end of the mounting member 12.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected by the appended claims.

What is claimed is:

1. A bracket assembly for mounting objects on a shopping cart having a handle and a rear gate having a pivot bar, the bracket assembly comprising:

a mounting member having spaced apart ends extending angularly from a central portion, wherein one of the spaced apart ends forms an angled surface for supporting an object mounted thereto, and the other end forms a hook configured to receive the pivot bar of the gate of the shopping cart; and a clamp configured to receive the handle of the shopping cart and adjustably attached to the mounting member central portion such that the clamp extends below an outer surface of the mounting member central portion.

2. The bracket assembly of claim 1 wherein:

the central portion of the mounting member further includes spaced apart bores extending transversely therethrough; and the clamp includes outturned ends having transverse slots positioned to align with the spaced apart bores of the central portion of the mounting member.

3. The bracket assembly of claim 1, further comprising:

a support member having spaced apart ends extending angularly outward from a central portion, wherein the spaced apart ends of the support member are configured to operably engage an inner surface of the mounting member and wherein the support member is attached to the mounting member at the central portion and at one of the spaced apart ends of the mounting member.

4. The bracket assembly of claim 3, further comprising:

a spacer having a body configured to cooperatively engage a hook-shaped end of the mounting member.

5. The bracket assembly of claim 4, wherein the spacer further includes a recess formed on a bottom surface and configured to receive a free end of the hooked-shaped end of the mounting member.

6. The bracket assembly of claim 4, wherein:

the hook-shaped end of the mounting member includes a pair of axially aligned bores extending therethrough; and the body of the spacer further comprises a longitudinal bore positioned to align with the axially aligned bores of the hook-shaped end of the mounting member when the spacer is operably positioned at the hook-shaped end of the mounting member.

7. The bracket assembly of claim 4 further comprising:

at least one fastener for attaching the components of the bracket assembly.

8. A bracket assembly for mounting objects on a shopping cart, comprising:

a mounting member having an upwardly extending end forming an angled surface capable of receiving an object which extends beyond the surface, a hook-shaped end, and a central portion therebetween; and a clamp extending below an outer surface of the mounting member and central portion adjustably attached thereto, wherein the clamp is configured to receive a handle of the shopping cart.

9. The bracket assembly of claim 8 wherein:

the central portion of the mounting member further includes spaced apart bores extending transversely therethrough; and the clamp includes outturned ends having transverse slots positioned to align with the spaced apart bores of the central portion of the mounting member.

10. The bracket assembly of claim 8, further comprising:

a support member having spaced apart ends extending angularly outward from a central portion, and operably attached to the mounting member at an inner surface.

11. The bracket assembly of claim 10, wherein:

one of the spaced apart ends of the support member extends outwardly from the central portion of the support member to form a right angle therewith, and the other end of the support member extends from the central portion of the support member to form an obtuse angle therewith.

12. The bracket assembly of claim 10, further comprising:

a spacer having a body having a recess formed on a bottom surface and configured to cooperatively engage the hook-shaped end of the mounting member.

13. The bracket assembly of claim 12, wherein:

the hook-shaped end of the mounting member includes a pair of axially aligned bores extending therethrough; and the body of the spacer further comprises a longitudinal bore positioned to align with the axially aligned bores of the hook-shaped end of the mounting member when the spacer is operably attached thereto.

14. The bracket assembly of claim 12 further comprising:

at least one fastener for attaching the components of the bracket assembly.

15. A bracket assembly for mounting objects on a shopping cart having a handle and a rear gate having a pivot bar, the bracket assembly comprising:

a mounting member having an upwardly extending end forming a mounting surface for receiving an object, a hook-shaped end for receiving the pivot bar of the rear gate of the shopping cart, and a central portion therebetween having spaced apart bores extending therethrough;

a clamp secured to said central portion and having outturned ends having slots, wherein the clamp is configured to receive the handle of the shopping cart and the slots are positioned to align with the spaced apart bores of the central portion of the mounting member for adjustable attachment thereto;

a support member having spaced apart ends extending angularly outward from a central portion, wherein the spaced apart ends of the support member are configured to operably engage an inner surface of the mounting member and wherein the support member is attached to the mounting member at the central portion and one of the spaced apart ends of the mounting member;

a spacer having a body having a recess formed therein for receiving the hook-shaped end of the mounting member; and at least one fastener for attaching the bracket assembly.

16. The bracket assembly of claim 15, wherein:

the upwardly extending end of the mounting member forms an acute angle with the central portion of the mounting member.

17. The bracket assembly of claim 15, wherein:

one of the spaced apart ends of the support member extends outwardly from the central portion of the support member to form an angle therewith, and the other end of the support member extends from the central portion of the support member to form an obtuse angle therewith.

18. The bracket assembly of claim 15, wherein:

the hook-shaped end of the mounting member includes a pair of axially aligned bores extending therethrough; and the body of the spacer further comprises a longitudinal bore positioned to align with the axially aligned bores of the hook-shaped end of the mounting member when the spacer is operably positioned at the hook-shaped end of the mounting member.

\* \* \* \* \*